(12) United States Patent
Dichtl et al.

(10) Patent No.: US 7,077,888 B2
(45) Date of Patent: Jul. 18, 2006

(54) DEVICE FOR SEPARATING DUST FROM FLUE GASES FROM COMBUSTION PLANTS, ESPECIALLY SOLID FUEL COMBUSTION PLANTS

(75) Inventors: Harald Dichtl, Erlangen (DE); Thomas Hagen, Erlangen (DE); Roland Klaus, Dormitz (DE); Jörg Lengert, Lonnerstadt-Ailsbach (DE)

(73) Assignee: Siemens Aktiengesellschaft, Munich (DE)

( * ) Notice: Subject to any disclaimer, the term of this patent is extended or adjusted under 35 U.S.C. 154(b) by 286 days.

(21) Appl. No.: 10/754,943

(22) Filed: Jan. 9, 2004

(65) Prior Publication Data
US 2004/0139857 A1 Jul. 22, 2004

Related U.S. Application Data

(63) Continuation of application No. PCT/DE02/02561, filed on Jul. 12, 2002.

(30) Foreign Application Priority Data
May 17, 2001 (DE) ............... 101 34 821

(51) Int. Cl.
*B01D 46/30* (2006.01)
*B01D 46/32* (2006.01)
*B01D 46/00* (2006.01)
*B01D 45/12* (2006.01)
*B01D 50/00* (2006.01)

(52) U.S. Cl. .................. 95/274; 95/268; 95/269; 95/275; 95/276; 95/283; 55/282; 55/283; 55/284; 55/315; 55/345; 55/350.1; 55/474; 55/479; 55/512; 55/516; 55/518; 55/523; 96/421; 96/425; 165/4; 165/5; 165/10; 165/104.18; 34/165; 34/174

(58) Field of Classification Search .......... 55/282, 55/283, 284, 315, 342, 345, 350.1, 474, 479, 55/512–519, 523; 96/108, 421, 425; 95/274, 95/275, 276, 283, 269, 268; 165/4, 5, 10, 165/104.11, 104.15, 104.18; 34/165, 168, 34/174, 332, 345
See application file for complete search history.

(56) References Cited

U.S. PATENT DOCUMENTS 3,770,388 A * 11/1973 Zenz ............... 55/474
3,912,466 A * 10/1975 Zenz ............... 55/512

(Continued)

FOREIGN PATENT DOCUMENTS

EP 0 136 175 A2 3/1985

(Continued)

*Primary Examiner*—Jason M. Greene

(57) ABSTRACT

The invention relates to a device for separating dust from flue gases from combustion plants, especially solid fuel combustion plants, comprising at least one dust filter via which the flue gases are guided, and by means of which the dust from the flue gases can be filtered out as it passes through the dust filter. In order to produce a device which separates dust in a highly efficient manner and which can be operated in a highly reliable manner and be used to heat combustion air for the combustion plant, the at least one dust filter is embodied as a bulk material filter in whose bulk material heat from the flue gases can be collected when the bulk material is cross-flown by the flue gases and by means of whose bulk material heat collected from the flue gases when the combustion air of the combustion plant flows through the bulk material filter can be given off to said combustion air.

14 Claims, 2 Drawing Sheets

U.S. PATENT DOCUMENTS

| | | | | |
|---|---|---|---|---|
| 4,017,278 A | * | 4/1977 | Reese | 55/474 |
| 4,142,873 A | * | 3/1979 | Berz | 55/282 |
| 4,220,478 A | * | 9/1980 | Schuff | 55/474 |
| 4,255,166 A | * | 3/1981 | Gernand et al. | 55/474 |
| 4,307,773 A | * | 12/1981 | Smith | 165/104.16 |
| 4,597,433 A | | 7/1986 | Johnson | |
| 4,604,051 A | | 8/1986 | Davies et al. | |
| 4,622,210 A | * | 11/1986 | Hirschberg et al. | 55/474 |
| 4,650,647 A | * | 3/1987 | Kito et al. | 55/474 |
| 4,784,836 A | * | 11/1988 | Karlsson et al. | 165/104.12 |
| 4,875,335 A | * | 10/1989 | Arai et al. | 60/311 |
| 6,092,300 A | * | 7/2000 | Emmel et al. | 34/174 |
| 6,783,572 B1 | * | 8/2004 | Squires | 55/282 |

FOREIGN PATENT DOCUMENTS

| | | |
|---|---|---|
| EP | 0 908 692 A2 | 4/1999 |
| WO | WO 99/64138 | 12/1999 |

* cited by examiner

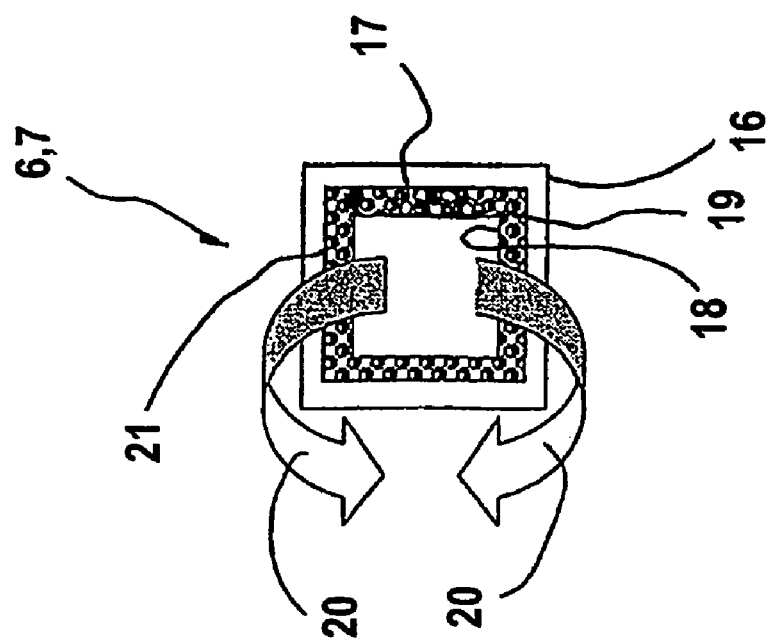
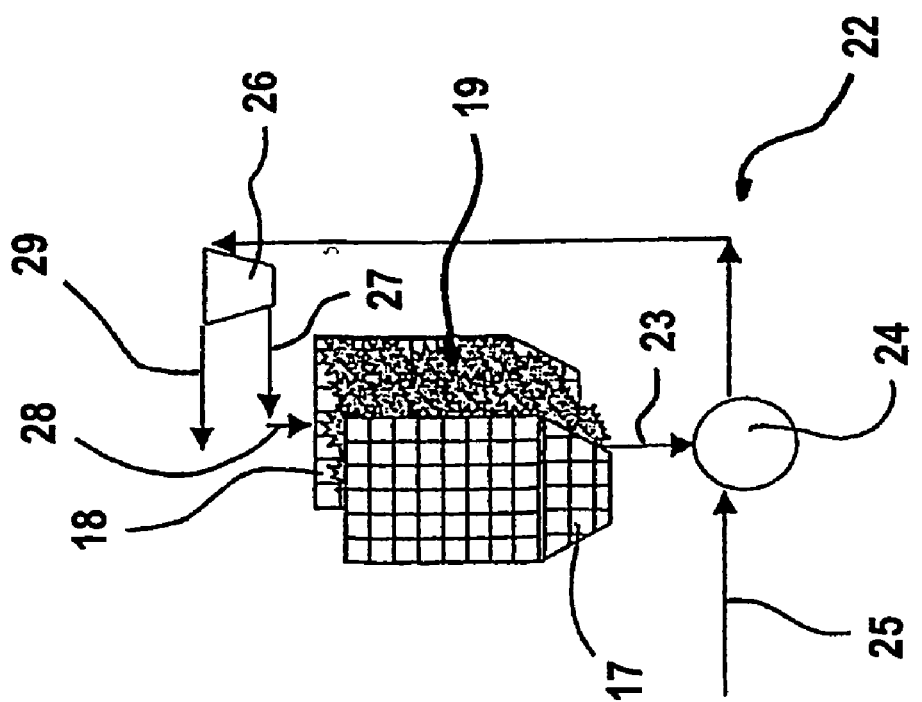
FIG 3
FIG 2

DEVICE FOR SEPARATING DUST FROM FLUE GASES FROM COMBUSTION PLANTS, ESPECIALLY SOLID FUEL COMBUSTION PLANTS

CROSS REFERENCE TO RELATED APPLICATIONS

This application is a continuation of International Application No. PCT/DE02/02561, filed Jul. 12, 2002 and claims the benefit thereof. The International Application claims the benefits of German application No. 10134821.5 filed Jul. 17, 2001, both of the applications are incorporated by reference herein in their entirety.

FIELD OF THE INVENTION

The invention concerns a device for separating dust from flue gases from combustion plants, especially from solid fuel combustion plants, with at least one dust filter, via which the flue gases are conducted and by means of which dust can be filtered out of the flue gases as they pass through the dust filter.

BACKGROUND OF INVENTION

During the course of the combustion processes in combustion plants —depending on the type of fuel used—there are dust emissions, whereby, especially in the case of solid fuel combustion plants and the fuels burnt there, these are of significant importance. To prevent such dusts being emitted into the environment, each country has different statutory regulations, which limit the dust content of flue gases on their entry into the surrounding atmosphere. Thus, for example, in the Federal Republic of Germany the 17th Ordinance for the Implementation of the Federal Imission Control Act (17 .BlmschV) and the Technical Instructions Air Quality Control 2000 (TA Luft 2000) apply, limiting the dust content of the flue gases entering into the surrounding atmosphere to <10 mg dust per standard cubic meter of flue gas.

As in the case of combustion plants used commercially, for example, in the case of large scale boiler plants, flue gas temperatures of over 240 degrees C. are a common occurrence, the heat contained in the flue gases is used to prewarm the combustion air to be fed into the combustion plant in order to better exploit the energy of the flue gases before or upstream of the actual device for separating dust.

Nowadays electrostatic filter devices, for example, electrostatic filters or fibrous filters, are used as devices for separating dust.

In known combustion plants, flue gas air preheaters (LUVO) of very different designs are used to preheat the combustion air, for example, rotating air preheaters, air flow preheaters, plate preheaters etc. In addition to relatively large energy losses, these show drops in pressure and are, moreover, subject to high mechanical stresses.

SUMMARY OF INVENTION

The object of the invention is to develop the device described initially for separating dust from flue gases from combustion plants, especially solid fuel combustion plants, in such a way that with it, on the one hand the heat contained in the flue gases of the combustion plant is more utilizable for preheating the combustion air to be fed to the combustion plant, whereby, on the other hand, the technical design of the structure of the device for separating dust should be simplified.

This object is achieved according to the invention in that at least one dust filter is formed as a bulk material filter, in the bulk material of which heat can be taken up from the flue gases when such flue gases flow through the bulk material filter and by means of the bulk material of such filter, when the combustion air of the combustion plant flows through the bulk material filter, the heat taken up from the flue gases can be conveyed to the combustion air.

As, in the case of the device for separating dust according to the invention, separate flue gas air preheaters are not necessary, there are, in comparison with the prior art, significantly less costs. This can be traced back to lower pressure drops, to less consumption of electrical energy, to savings in maintenance and less radiation loss due to cold surfaces. Thus the pressure drop in the case of a device for separating dust built according to the prior art—with a flue gas flow of 46500 standard cubic meters, 23.7 g water per kg air and aiming at a combustion air temperature of 128 degrees C.—is, for example, 18 mbar, as opposed to which, the pressure drop with the corresponding device designed according to the invention is only 13 mbar. The suction draught capacity in the case of the device for separating dust according to the prior art amounts to 220 kW; in the case of the device for separating dust according to the invention this is 150 kW. In the case of the device for separating dust according to the prior art, which has an electrostatic filter as filter element, the filter current requirement is 38 kW, whereas there is no such filter current requirement in the case of the device for separating dust according to the invention.

Expediently the device for separating gases according to the invention has at least two bulk material filters, through which the flue gases and the combustion air can flow alternately. When the flue gases flow through the bulk material filters the bulk material filters are heated, whereas, when the combustion air flows through the bulk material filters, the heat stored in the bulk material filters is released into the combustion air.

In order to provide the bulk material filters of the device for separating dust according to the invention with the best through flow characteristics, it is of advantage if each bulk material filter has a multi-surface casing, in which two grids are arranged parallel to the surfaces, and the bulk material of the bulk material filter is held between the said grids. As the two grids can have a relatively large surface, it is possible to achieve the substantially improved through flow characteristics aimed at in the bulk material filters used in the device for separating dust according to the invention.

Hereby, it is of particular advantage if the two grids each have a rectangular cross-section. Using appropriate measurements it is possible to create a space constant with respect to its width between the two grids, in which space the bulk material of the bulk material filter can be taken up and held.

If the bulk material of the bulk material filter or filters is formed in such a way that it has a large specific surface and a small contact surface, it is ensured that the conduction of heat by the individual components of bulk materials is negligible compared to the heat uptake of the bulk material from the flue gas. This makes a reversible temperature behavior curve with steep temperature gradients in the bulk material layers possible.

Rubble capable of storing heat, especially natural chamotte, has proven to be a particularly advantageous bulk material.

The dimensions of the grids of the bulk material filter and the thickness of the bulk material layer formed between the grids can be advantageously arranged to match the volume of the flue gas flow and the temperature level to be set, whereby, it goes without saying that that also applies to the quality of the bulk material to be chosen.

For the chronologically successive loading of the bulk material filter of the device for separating dust according to the invention with flue gas and combustion air, it is of advantage, if, using a flap control system, either a flue gas flow or a combustion air flow can be routed through the respective bulk material filter.

In order to avoid excessive pressure drops due to high dust load in the bulk material of the bulk material filter of the device for separating dust according to the invention, it is recommended that in accordance with an advantageous embodiment of the device for separating dust according to the invention, each bulk material filter has a bulk material dedusting device, by means of which the dust separated from the flue gases and taken up in the bulk material of the bulk material filter can be separated from the bulk material.

The bulk material dedusting device of each bulk material filter can advantageously be put into operation when the combustion air flows through it relative to the pressure drop at the bulk material filter.

For removing polluted bulk materials from the space between the two grids of the bulk material filter, the bulk material dedusting device of the filter advantageously has an initial material lock placed under the bulk material of the bulk material filter, and by means of this lock the bulk material dust mixture can be extracted in batch quantities from the bulk material filter. The extraction can be done by gravity because of the siting under the bulk material between the grids of the bulk material filter.

Expediently, the bulk material dedusting device of each bulk material filter has a lower collecting tank placed in the material flow direction downstream of the first material lock, from which tank the bulk material dust mixture can be routed to a cyclone separator using a conveying airflow, whereby the bulk material and the dust can be separated from each other.

The bulk material with the dust removed goes from a bulk material removal outlet of the cyclone separator into an upper collecting tank, from which it is returned between the grids of the bulk material filter by means of a second material lock. The collecting tank or the second material lock is arranged above the two grids, so that the introduction of the cleaned bulk material into the space between the two grids can also be effected by gravity.

It is of advantage if a dust exhaust or an outgoing airflow from the cyclone separator of the bulk material dedusting device of each bulk material filter leads to an ash collecting tank or to a fibrous filter.

In a method according to the invention for separating dust from flue gases from combustion plants, especially solid fuel combustion plants, in which method the flue gases are dedusted in dust filters, the heat contained in the flue gases is stored in the bulk material of the dust filter constructed as a bulk material filter and the heat stored in the bulk material is released to the combustion air flowing through the bulk material filter.

With the method according to the invention, it is possible to attain heat recovery levels of over 95%. According to a particularly advantageous development of the method according to the invention, each bulk material filter is switched from the flue gas flow into the combustion airflow, as soon as or shortly before the bulk material filter reaches the flue gas temperature at its outlet side. Hereby the maximum heat uptake capacity of the bulk material is exploited, whereby this maximum heat taken up is then also available to cool the combustion air.

Expediently, the bulk material is cleaned of the dust taken up by it while the bulk material filter emits heat to the combustion air current, whereby the cleaning process can be carried out continuously.

Of advantage is that the polluted bulk material is removed from the bulk material filter in batch quantities by gravity, whereby the dust and the bulk material are separated from each other, before the cleaned bulk material is returned to the bulk material filter in batch quantities by gravity.

In the following, the invention is explained in greater detail using an embodiment and with reference to the drawings.

The following is depicted:

BRIEF DESCRIPTION OF THE DRAWINGS

FIG. 2 a basic illustration for the invention of essential components of a dust or bulk material filter of the device, according to the invention, for separating dust shown in FIG. 1; and FIG. 3 a basic illustration of flue gases, which flow through a bulk material filter of the device for separating dust shown in FIG. 1.

DETAILED DESCRIPTION OF INVENTION

Figure 1:
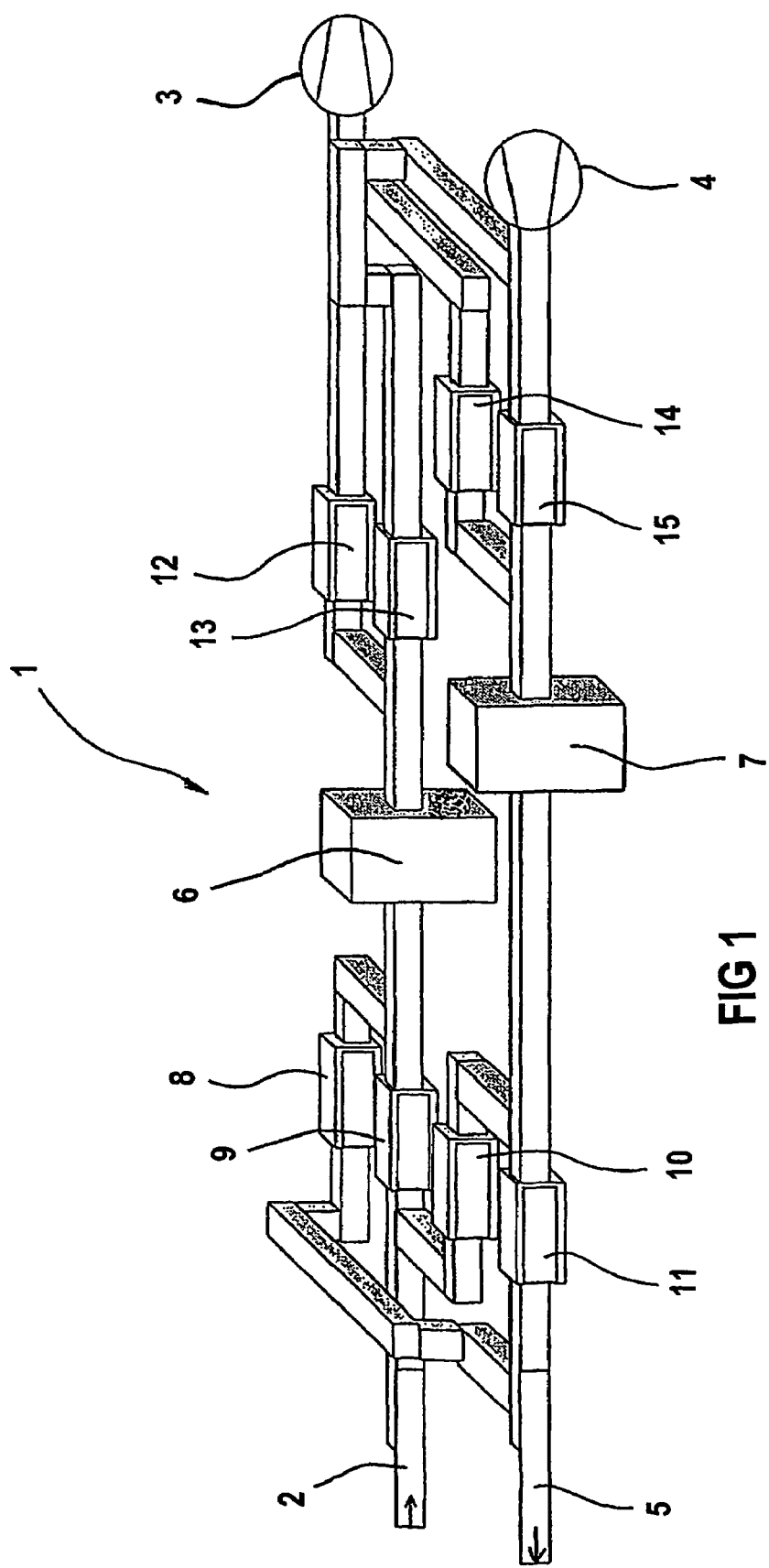
FIG. 1 an embodiment of a device according to the invention for separating dust from flue gases from combustion plants, especially from solid fuel combustion plants.

An embodiment of a device 1, according to the invention, for separating dust from flue gases from combustion plants, especially solid fuel combustion plants, is shown in a basic illustration in perspective in FIG. 1 and serves to reduce the dust content of flue gases that occur in the combustion plant during the combustion process. Thus, in the Federal Republic of Germany, for example, currently such flue gases must have a dust content of only <10 mg per standard cubic meter when they enter the surrounding atmosphere (17 . BlmschV and TA Luft 2000).

Using a suction draught device 3, a flue gas flow 2, shown in FIG. 1, and removed from the combustion plant is routed through the device 1 for separating dust shown in FIG. 1. In the opposite direction, using a fresh air fan 4, combustion airflow 5 is led through the device 1 for separating dust and from there to the combustion plant.

In the embodiment shown in FIG. 1, the device 1 for separating dust shown there has two dust filters 6, 7. The dust filters 6, 7 are, as will be described later, each constructed as bulk material filters 6, 7.

Flue gas flow 2 and combustion airflow 5 flow alternately through each dust or bulk material filter 6, 7. To that purpose, in the line system of the device 1 for separating dust in the embodiment represented, eight valves 8, 9, 10, 11, 12, 13, 14 and 15 are provided for, which form a flap control system 8 to 15 for the two dust or bulk material filters 6, 7.

When flue gas flow 2 flows through the upper dust or bulk material filter 6 in FIG. 1 and combustion airflow 5 flows through the lower dust or bulk material filter 7 in FIG. 1, the valve 8 is closed, the valve 9 open, the valve 10 closed, the valve 11 open, the valve 12 open, the valve 13 closed, the valve 14 closed and the valve 15 open. The flue gas flow 2 is routed through the valve 9 into the upper dust or bulk material filter 6 in FIG. 1 and from there through the valve 12 to the suction draught device 3; accordingly, the combustion airflow 5 is routed by the fresh air fan 4 through the valve 15, the lower dust or bulk material filter 7 in FIG. 1 and the valve 11 on to the combustion plant.

When the flue gas flow 2 is routed through lower dust or bulk material filter 7 in FIG. 1 and the combustion airflow 5 through the upper dust or bulk material filter 6 in FIG. 1, then valve 8 is open, the valve 9 closed, the valve 10 open, the valve 11 closed, the valve 12 closed, the valve 13 open, the valve 14 open and the valve 15 closed. The flue gas flow 2 is routed through the valve 10 to the lower dust or bulk material filter 6 in FIG. 1 and from there to the suction draught device 3 via the valve 14; accordingly, the combustion airflow 5 is routed through the valve 13 to the upper dust or bulk material filter 6 in FIG. 1 and from there through the valve 8 to the end section facing the combustion plant of the device 1 for separating dust.

As already mentioned, the flue gas flow 2 and combustion airflow 5 alternately flow through the two dust or bulk material filters 6, 7.

As can be seen from FIGS. 2 and 3, each dust or bulk material filter 6, 7 is constructed as follows:

Each dust or bulk material filter 6, 7 has a multi-surface casing 16, in the interior of which two grids 17, 18 are arranged with their surfaces parallel to each other. As can be seen from FIG. 3, the dimensions of the inner grid 18 are slightly less than those of the outer grid 17, thus forming a space or reception area for bulk material 19 between the two grids 17, 18. The entire space between the grids 17, 18 is filled up with bulk material 19. The bulk material 19 is preferably rubble capable of storing heat, e.g. natural chamotte.

As is shown particularly in FIG. 3, the hot flue gases 20 entering the device 1 for separating dust from the combustion plant are introduced into the interior of the dust or bulk material filter 6, 7 formed by the two grids 17, 18 and the bulk material 19. In order to leave the dust or bulk material filter 6, 7, the hot flue gases 20 have to flow through the bulk material 19 which is held between the grids 17, 18. Hereby, the dust contained in the flue gases 20 is separated very effectively from the flue gases 20. Moreover, when the flue gases 20 pass through the bulk material 19, heat contained in the flue gases 20 is taken up by the bulk material 19 and stored.

The rubble capable of storing heat chosen as the bulk material 19 contains, in comparison with its specific surface, only very few contact surfaces. Thus heat transfer takes place almost exclusively between the flue gases 20 and the bulk material 19, whereas the transfer of heat or conduction of heat within the bulk material 19 is negligible. Correspondingly, a reversible temperature behavior curve with steep temperature gradients appears in the layering which contains the bulk material 19.

As soon as a temperature breakthrough through the layering of the bulk material 19 is imminent, i.e. as soon as the temperature in the area of the outlet side 21 or the outer grating 17 reaches flue gas temperature, the supply of flue gases 20 to the respective dust or bulk material filter 6, 7 is interrupted, whereby the flue gases 20 are sent to the respective other dust or bulk material filter 7 or 6, as has been described using FIG. 1.

The combustion airflow 5 then flows through the dust or bulk material filter 6, 7 heated to the flue gas temperature by the flue gases 20. Hereby, the combustion airflow 5 is heated and the dust or bulk material filter 6 is recooled.

In the design of the dust or bulk material filter 6, 7, the sizes of the grids 17, 18 as well the layer thickness of the bulk material 19 is adapted to the flue gas mass flow 2 expected in the operation of the device 1 for separating dust and to the flue gas temperature expected as well as the desired temperature of the combustion air.

As the flue gas flow 2 flows through the dust or bulk material filter 6, about 99% of the dusts contained in the flue gas flow 2 or in the flue gases 20 are separated. As the combustion airflow 5 flows through the dust or bulk material filter 6, 7 after the latter has been warmed up by the flue gases 20, over 95% of the heat stored in the bulk material 19 of the dust or bulk material filter 6, 7 can be released to the combustion airflow 5. That means that with the dust or bulk material filter 6, 7 described above, heat recovery levels of >95% are possible. In the dimensioning of the dust or bulk material filter 6, 7 of the device 1 for separating dust, consideration will also be given to other economic aspects and to the intended change-over cycles with respect to the loading with flue gas or combustion air.

As can be seen especially in FIG. 2, each dust or bulk material filter 6, 7 is equipped with a bulk material dedusting device 22.

This is described in more detail below.

When the combustion airflow 5 flows through the dust or bulk material filter 6, 7,—controlled by the pressure drop at the dust or bulk material filter 6, 7—the bulk material 17 is dedusted. The bulk material 19 is held between the inner, smaller grating 18 and the outer, larger grating 17. In the lower area of the dust or bulk material filter 6, a first material lock 23, represented only in principle in FIG. 2, is provided. Through this first material lock 23, the mixture from bulk material 19, and the dust taken up in it, is extracted in batch quantities by gravity out of the space between the grids 17, 18. Hereby, the said mixture of dust and bulk material 19 arrives in a lower collecting tank 24, from which the mixture is routed to a dedusting cyclone or cyclone separator 26 by means of a pressure or conveying airflow 25. In the dedusting cyclone or cyclone separator 26, the dust and the bulk material 19 are separated from each other, whereby the bulk material 19 with the dust removed is blown via a bulk material removal outlet 27 of the dedusting cyclone or cyclone separator 26 into a collecting tank (not shown in FIG. 2) placed above the space between the grids 17, 18. The cleaned bulk material is reintroduced by gravity into the space between the two grids 17, 18 of the dust or bulk material filter 6 through a second material lock 28 which is also represented in principle only.

The outgoing air (precleaned up to 95%) from the dedusting cyclone or cyclone separator 26 undergoes afterpurification via a fibrous filter; a dust exhaust 29 of the dedusting cyclone or cyclone separator 26 is routed to an ash collecting tank.

The dust or bulk material filters 6, 7 of the device 1 for separating dust according to the invention and described in greater detail using the Figures above, also act as a preheating filter or as integrated air preheating for the combustion airflow 5 to the combustion plant. Thus it is possible to do without other measures for preheating the air of the combustion airflow 5, or such measures can be reduced.

We claim:

1. A filter device for separating dust from flue gases in combustion plants, comprising:
    a dust filter positioned along the flue gas path, the dust filter comprising:

a multi-surface casing,
a first grid formed on or within the casing having a substantially rectangular cross-section and a surface,
a second grid formed on or within the casing having a substantially rectangular cross-section and a surface, the surface of the first grid arranged substantially parallel to the surface of the second grid,
at least one bulk material filter arranged between the substantially parallel surfaces,
wherein when the flue gas flows through the bulk material filter, heat from the flue gas is absorbed by the bulk material filter, and
wherein when combustion air from the combustion plant flows through the bulk material filter, the bulk material filter heat is released to the combustion air, in which the bulk material filter has a bulk material dedusting device, the dedusting device adapted to separate the dust from the bulk material, wherein the bulk material dedusting device has a lower collecting tank arranged in the flue gas flow direction downstream of a first material lock of the bulk material dedusting device, from which tank the bulk material dust mixture can be routed by a conveying airflow to a cyclone separator in which the bulk material and the dust can be separated from each other.

2. A filter device for separating dust according to claim 1, comprising at least two bulk material filters through which the flue gases and the combustion air alternately flow.

3. A filter device for separating dust according to claim 1, wherein the bulk material filter has a layer of bulk material with a large specific surface and a stall contact surface.

4. A filter device for separating dust according to claim 1, wherein the bulk material filter has a layer of bulk material comprising rubble.

5. A filter device for separating dust according to claim 1, wherein the bulk material filter has a layer of the bulk material comprising natural chamotte.

6. A filter device for separating dust according to claim 1, wherein the first and second grid dimensions as well as the thickness of the bulk material is adapted to match the flue gas flow volume and temperature.

7. A filter device for separating dust according to claim 1, wherein the flue gas flow and the combustion air flow is routed through the bulk material filter by a flap control system.

8. A filter device for separating dust according to claim 1, wherein the dedusting device operates as a function of a pressure drop when the combustion air is flowing through the the bulk air filter.

9. A filter device for separating dust according to claim 1, wherein the first material lock is arranged under a bulk material of the bulk material filter, the first material lock allowing the bulk material dust mixture to be extracted from the bulk material filter in batch quantities.

10. A filter device for separating dust according to claim 1, wherein the bulk material dedusting device has an upper collecting tank arranged in the flue gas flow direction downstream of a bulk material removal outlet of the cyclone separator and above the bulk material of the bulk material filter, from which tank the cleaned bulk material can be returned by a second material lock between the grids of the bulk material filter.

11. A filter device for separating dust according to claim 1, wherein a dust exhaust or an outgoing airflow of the cyclone separator of the bulk material dedusting device of each bulk material filter is routed to an ash collecting tank or to a fibrous filter.

12. A method for separating dust from flue gases from a combustion plant, comprising:
providing a dust filter positioned along the flue gas path, the dust filter having at least one bulk material arranged between substantially parallel surfaces of the dust filter;
absorbing heat from the flue gas by the bulk material when the flue gas flows through the bulk material;
releasing the heat from the bulk material to air when air from the combustion plant flows through the bulk material;
dedusting the flue gases in the dust filter;
wherein the dust filter is switched from accepting the flue gas flow to accepting the combustion air flow as soon as or shortly before a portion of the bulk material reaches the flue gas temperature, and
providing a bulk material dedusting device with a lower collecting tank arranged in the flue gas flow direction downstream of a first material look of the bulk material dedusting device, from which tank the bulk material dust mixture can be routed by a conveying airflow to a cyclone separator in which the bulk material and the dust can be separated from each other.

13. A method for separating dust according to claim 12, wherein the bulk material is cleaned of dust absorbed while the bulk material transfers heat to the combustion air flow.

14. A method for separating dust according to claim 12, wherein polluted bulk material is removed from the dust filter in batch quantifies by gravity, the dust and the bulk material being separated from each other, and the cleaned bulk material routed by gravitation to the dust filter in batch quantifies.

* * * * *